July 31, 1945.　　　F. WILLIS, JR　　　2,380,486
LIGHTING CONTROL SYSTEM
Filed March 11, 1942　　　2 Sheets-Sheet 1

INVENTOR.
FLOYD WILLIS Jr.
BY
Lester B Clark,
ATTORNEY.

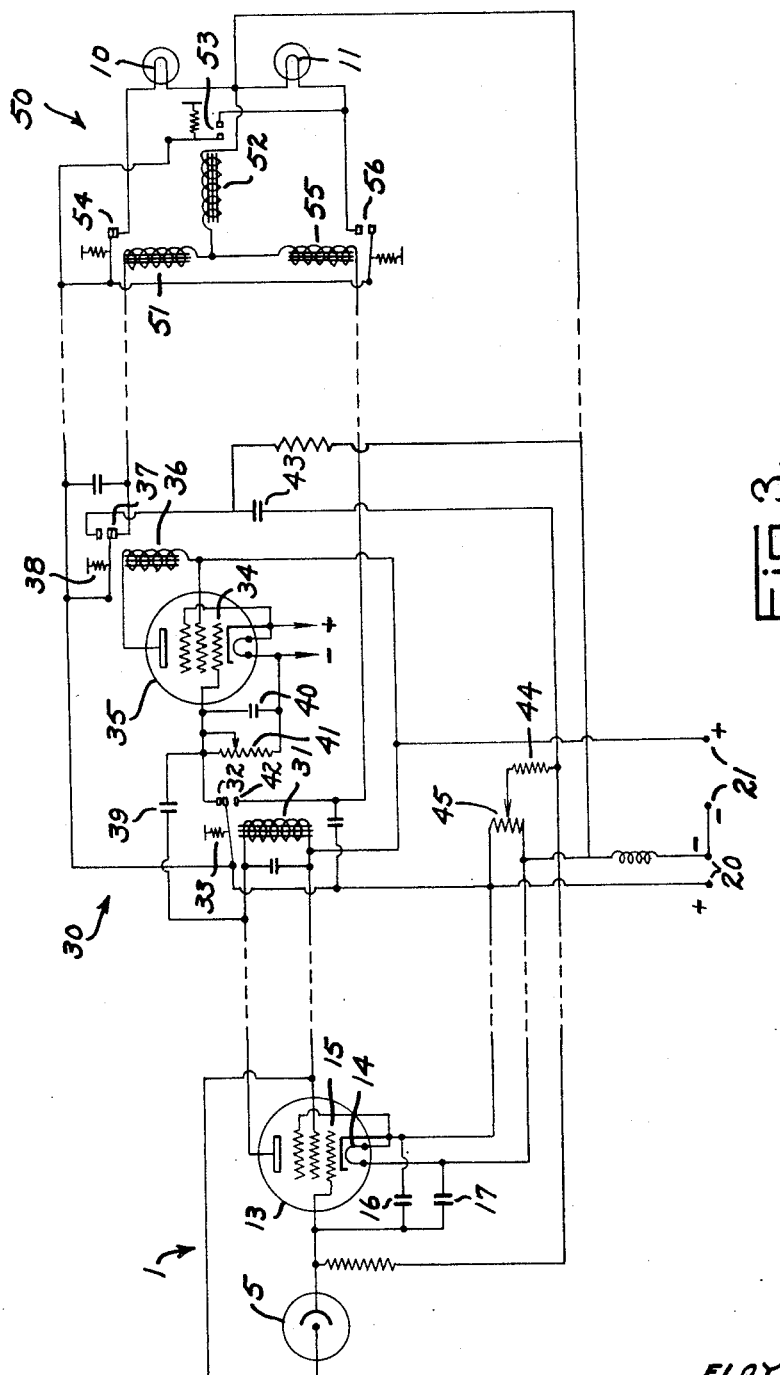

Patented July 31, 1945

2,380,486

UNITED STATES PATENT OFFICE 2,380,486

LIGHTING CONTROL SYSTEM

Floyd Willis, Jr., Tulsa, Okla.

Application March 11, 1942, Serial No. 434,211

5 Claims. (Cl. 250—41.5)

This invention relates to control devices for electric illuminating circuits and more particularly to an automatic device for opening and closing circuits such as illumination displays or the automatic deflecting or dimming of the headlights of automotive vehicles.

It is commonplace to provide illuminated display devices or signs proximate highways so that such devices are made visible at night to the passing motorist. Such devices include switching means, either proximate or remote therefrom, whereby the illuminating circuit can be closed and opened so that illumination is provided for desired portions of the day and night. Such an arrangement, however, requires a constant illumination during the period intermediate the closure and the opening of the circuit, which interval is usually the period between dusk and dawn. In many instances the illuminating energy is wasted as the display device is in constant operation whether or not the persons for whom the display is intended are proximate thereto.

It is a primary object of this invention to conserve energy without impairment of results by providing a device whereby an illuminating display circuit will be closed, or energized, only when a source of light, such as the headlights of an automotive vehicle, is in the vicinity of the control mechanism for the display.

Even where it is desirable that an illuminating circuit be substantially constantly energized, as in urban areas, occasions arise where it is desirable to control the circuit instantly as, for example, in compliance with blackout regulations. Such control is frequently inconvenient unless the services of a control operator are retained. This invention also comprehends as a further object the provision of means for controlling an illuminating display circuit by means of radiant energy from a separate circuit which is under constant control.

Another object is to provide a circuit control device which is responsive to radiant energy and adapted to maintain a circuit closed during the time that such energy is supplied to the device.

Still another object is to provide a device including an adjustable electronic delay whereby the opening of the control circuit is delayed by a predetermined amount after the energizing source of radiant energy has been removed.

The present invention also comprehends, and it is an object of the invention to provide, photoelectric control of vehicle headlights whereby the dim or depressed headlight beam is used whenever approaching an oncoming vehicle.

Another object is to provide an automatic headlight dimmer including mechanism for accelerating the dimming operation when a beam of light is suddenly applied to the device.

The foregoing and other objects will be more fully apparent from the following description taken in connection with the accompanying drawings in which:

Fig. 3 is a schematic diagram of a circuit whereby the invention is utilized to automatically control the dimming of the headlights of an automotive vehicle.

Figure 1:
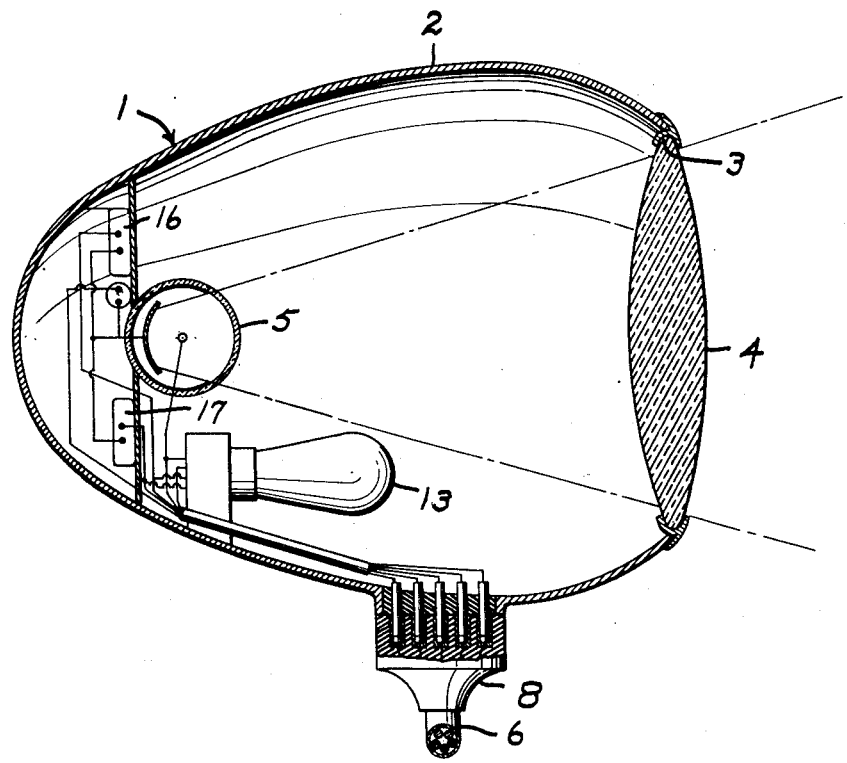
Fig. 1 is a sectional view through a pick-up unit within which the light responsive cell of the device is housed together with other elements of the device.

In Fig. 1 there is shown a light responsive or pick-up unit 1 which constitutes a portion of the embodiment of the invention. This unit may be placed in any desired location where it will receive radiant energy from a source which, it is intended, shall effect the operation of the control mechanism. The unit may be located near the circuit to be controlled or remote therefrom. Attention is directed to the fact that this disclosure refers to a light responsive device and it is intended by such terminology to include a device which is responsive to radiant energy both within and without the visible spectrum.

The unit 1 comprises the housing 2 having at its forward end an opening 3 which is preferably elongated in a plane perpendicular to the figure and is provided with a lens 4 to concentrate light upon an elongated photoelectric cell 5 mounted within the housing 2. Other elements of the device are also mounted within the housing, as will presently appear, and a multi-conductor cable 6 terminating in a plug 8 facilitates interconnection between the pick-up unit 1 and the remainder of the electric circuit of the control system.

Reference is now made to Fig. 3 which shows a circuit diagram in accordance with the invention for controlling the headlights of an automotive vehicle in a manner that the elevated or bright beam from the filament 10 is normally lighted. The device is so constructed, however, that a beam of light falling upon the photoelectric cell 5 will effect such control of the circuit that the filament 10 is extinguished and the dim or depressed beam from the filament 11 will be lighted during the time interval that the cell 5 is excited by the beam of light falling thereon.

The complete system of the invention may comprise component units such as the light responsive or pick-up unit 1, a control unit generally referred to as 30, and a power relaying unit shown as 50. The dotted interconnections between the units 1, 30 and 50 are illustrative of the fact that, if desired, these units may be separate and distinct and in spaced relation one to the other. It is to be understood, of course, that the units may be embodied in a single group and enclosed in a housing if so desired, the illustration being intended primarily to simplify an understanding of the invention.

The unit 1 includes the photoelectric cell 5 and the vacuum tube 13. The heater 14 of the tube 13 is heated by an electric current supplied from a source, such as the usual vehicle battery, connected to the terminals 20. The plate circuit of the tube 13 includes a relay 31 and this circuit is supplied from a suitable source of potential connected to the terminals 21 of the control unit 30.

The relay 31 is normally closed against the upper contact 32 by means of the spring 33 so that a suitable bias, preferably zero, is placed upon the input grid 34 of the vacuum tube 35. This bias upon the grid 34 causes a sufficient current to flow in the tube 35 that the relay 36 in the plate circuit of this tube is energized and closes upon the contact 37 against the tension of the spring 38. Current then flows from the left terminal 20 to and through the contact 37 and thence through relays 51 and 52 of the power relay unit 50. The energization of the relay 52 opens its normally closed contacts 53 and the contacts 54 of relay 51 are closed, whereby a current is supplied directly from the terminals 20 to the filament 10. This condition exists so long as the current through relay 51 is insufficient to close such relay.

Attention is here directed to the fact that the potential placed upon the input grid 34 of the tube 35 also charges the condenser 40 which is shunted by a resistor 41. Further reference will be made to the function which these elements perform in the circuit.

If radiant energy, such as a beam of light from the headlight of an oncoming vehicle, falls upon the cell 5, the input grid 15 of the tube 13 becomes more positive and the plate current of this tube increases as a result, to actuate the relay 31 so that the circuit through the contact 32 is broken and a new circuit through the contact 42 is closed. Current then flows from the left terminal 20 to and through the relay 55 of the power relay unit and the relay 52 whereby the latter is maintained open while the former is closed upon the contact 56. Current then flows from the terminals 20 through the filament 11 whereby there is provided a dim or depressed beam of light.

By virtue of the charge placed upon the condenser 40, as above explained, the plate current of the tube 35 does not immediately decrease sufficiently that the relay 36 is opened. Hence the filament 10 continues to be illuminated momentarily and until the charge on the condenser 40 has decreased sufficiently to permit the relay 36 to open. For this reason both of the filaments 10 and 11 are momentarily illuminated, this simultaneous lighting of the filaments temporarily supplying an intense beam which is instrumental in assuring the actuation of a similar device installed upon an oncoming lighted vehicle.

Another important feature of the invention resides in the utilization of a condenser 39 between the plate of the tube 13 and the input grid 34 of the tube 35. This condenser 39 becomes quickly charged when a surge of current takes place in the plate circuit of the tube 13 as when a light is suddenly applied to the photoelectric cell 5. The charge is such as to overcome the charge on the condenser 40 and hence substantially instantaneous operation of the dimming mechanism takes place.

During the time the cell 5 is subjected to a beam of light the condensers 16 and 17, connected between the input grid 15 and the filament 14, become charged. When the oncoming light beam decreases, by dimming, the charges on these condensers decrease slowly but are sufficient that the plate current of the tube 13 maintains the relay 31 closed so that the depressed beam from the filament 11 is continuously maintained although the lights of the oncoming vehicle have been dimmed. This delay in discharge of the condensers 16 and 17 is augmented by the circuit which includes the condenser 43 and the resistor 44 which supply a fixed constant delay of the bias initially determined by the resistor 45 across the terminals of the filament 14 of the tube 13.

An additional important function of the condensers 16 and 17 is that of maintaining the filament 11 lighted for a brief interval after the energizing beam of light has been removed from the cell 5. In the absence of such control the filament 10 would be lighted the instant the light beam ceases to fall upon the cell 5. Hence in event of successive oncoming vehicles there would be a complete operation effected from the headlights of the successive vehicles. By means of the construction just described the depressed beam is maintained continuously until the exciting source of light has been removed and a sufficient time for the charges on the condensers 16 and 17 to leak therefrom.

Relay 52, to which reference has been made, is an underload relay and serves in case of circuit failure to maintain the filament 11 illuminated so that the dim or depressed beam is constantly maintained in event any other portion of the device fails to function.

Figure 2:
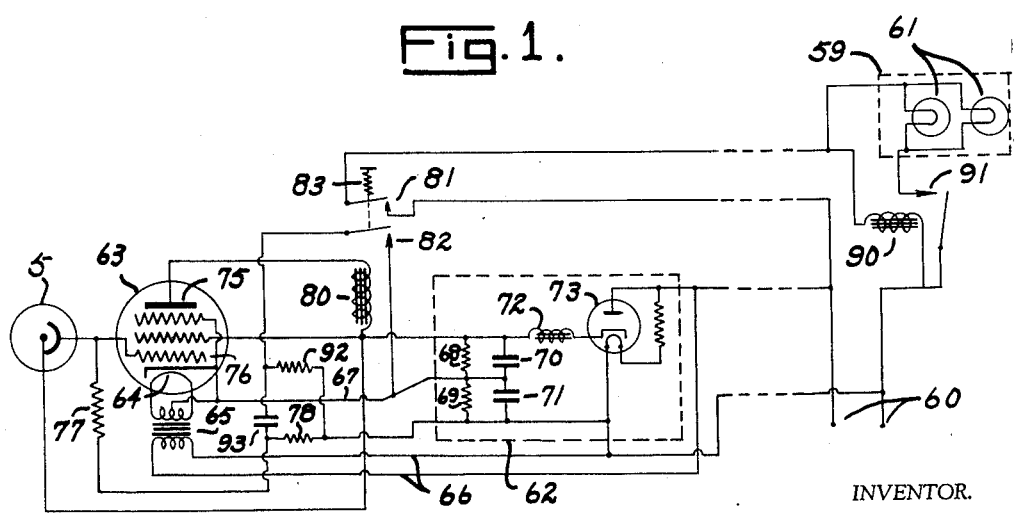
Fig. 2 is a schematic diagram of the circuit utilizing the invention for controlling the illumination of a light display or sign.

Reference is now made to the circuit shown in Fig. 2 which is designed to control illuminated displays such as signs, window displays, etc. It is to be understood that a unit such as that shown in Fig. 1 may be used and such unit may be placed where it will be stimulated by the headlight of an approaching vehicle or in a position to be stimulated by light from existing lighting installations which are under the constant control of an operator.

In this embodiment a conventional source of electrical energy such as 110 volts alternating current is supplied to the terminals 60, it being intended that such source shall be utilized to energize the lighting elements 61 of the display device 59. This embodiment of the invention includes a current conversion or rectifying unit 62 by means of which suitable potentials are supplied to the vacuum tube 63 and the photoelectric cell 5.

The filament 64 for the heated cathode of the tube 63 is connected to the secondary terminals of a transformer 65 of which the primary windings are directly connected to the terminals 60 through conductors 66. The mid point of the secondary windings of the transformer 65 has a direct connection 67 to the common connection of the resistors 68 and 69 and the condensers 70 and 71 of the rectifying unit 62. These resistors and condensers, together with the inductance 72 and the rectifying tube 73, supply a potential between the filament 64 and the plate 75 of the tube 63 and also between the elements of the cell 1. The cathode of the cell is directly connected to the input grid 76 of the tube 63 and the connection thereto includes a resistor 77 and a second resistor 78.

The plate circuit of the tube 63 includes a relay 80 having a pair of switch blades for contact respectively with terminals 81 and 82. The switch blades are normally held in open position by a spring 83, it being understood that the blades will close upon their respective contacts when the relay is sufficiently energized by current flowing in the plate circuit of the tube 63.

Closure of the upper switch blade with the contact 81 completes a circuit from the terminals 60 and through the relay 90 to effect closure thereof with the terminal 91 so that current is also supplied to the illuminating elements 61 of the display device 59.

Closure of the switch blades of the relay 80 also completes a circuit from one terminal of the rectifying unit 62 through a resistor 92 to the conductor 67, a condenser 93 being interposed between the remote ends of the resistors 78 and 92. By reason of this construction the condenser 93 becomes charged whenever the relay 80 is actuated by a beam of light striking the cell 5.

The operation of the circuit is believed apparent from the foregoing description. By way of summary, it may be stated that light striking the photoelectric cell 5 from a vehicle headlight, a controlled highway illuminator, or other source of light causes the input grid 76 to become sufficiently positive that current flowing through the relay 80 increases and operates the relay. As already explained, the closure of the relay energizes the relay 90 whereby energy from the terminal 60 is supplied directly to the elements 61 of the display device 59 on which the illumination is to be controlled and such elements will remain lighted until the relay 80 has again opened.

As already pointed out, the condenser 93 becomes charged during the period the cell is stimulated and the lights 61 remain in operation. Hence the bias is placed upon the input grid 76 of the tube 63.

If the cell 5 is excited from the headlights of a motor vehicle the amount of light decreases as the vehicle passes adjacent the cell. It is desirable, however, that for maximum efficiency the elements 61 remain lighted for a short period thereafter both to improve the continuity of the illuminated displays and also to avoid successive operations of the device in event a second source of light is about to move within the operating range of the device. This condition is made possible by the charge on the condenser 93 which leaks slowly therefrom through the resistors 92 and 78. When this charge upon the condenser has decreased to a certain point the bias upon the input grid 76 has lowered sufficiently that the plate current through the relay 80 falls and permits the relay to open, whereupon the relay 90 also opens and the light 61 is extinguished.

Broadly, the invention comprehends new and useful improvements in control devices for illuminating circuits, and in particular for the opening and closing of such circuits in response to radiant energy.

I claim:

1. In a device for the control of vehicle headlights the combination of, separate filaments to be energized, a source of energy for said filaments, means normally closing a circuit from said source to one of said filaments, and means responsive to radiant energy for deenergizing said one filament and energizing the other of said filaments from said source, said last mentioned means including means for maintaining said one filament energized for a predetermined period after the second filament is energized.

2. In a device for the control of vehicle headlights the combination of, separate filaments to be energized, a source of energy for said filaments, means normally closing a circuit from said source to one of said filaments, means responsive to radiant energy for deenergizing said one filament and energizing the other of said filaments from said source and for thereafter deenergizing the second filament and reenergizing the first filament when stimulating radiant energy is removed, said last mentioned means including electronic means for delaying said deenergization and reenergization for a predetermined interval after the stimulating radiant energy is removed.

3. In a device for the control of vehicle headlights the combination of, separate filaments to be energized, a source of energy for said filaments, means comprising a grid-controlled vacuum tube and a relay normally closing a circuit from said source to one of said filaments, means normally maintaining a bias on the grid of said tube means responsive to radiant energy for energizing the other of said filaments, and means for controlling the grid bias on said tube to hold said relay closed for a predetermined time after said other filament is energized.

4. In a device for the control of vehicle headlights the combination of, separate filaments to be energized, a source of energy for said filaments, means comprising a grid-controlled vacuum tube and a relay normally closing a circuit from said source to one of said filaments, means normally maintaining a bias on the grid of said tube means responsive to radiant energy for energizing the other of said filaments, means for controlling the grid bias on said tube to hold said relay closed for a predetermined time after said other filament is energized, and additional means for overcoming said bias when a beam of light is suddenly applied to the energy responsive means.

5. In a device for the control of vehicle headlights the combination of, separate filaments to be energized, a source of energy for said filaments, means normally closing a circuit from said source to one of said filaments, means responsive to radiant energy for energizing the other of said filaments, means for deenergizing said one filament at a predetermined time interval after the other is energized, and additional means for decreasing the time interval when a beam of light is suddenly applied to the energy responsive means.

FLOYD WILLIS, Jr.